United States Patent [19]
Amstad

[11] 3,766,845
[45] Oct. 23, 1973

[54] CENTRIFUGAL PROCESSING APPARATUS

[76] Inventor: John H. Amstad, 1359 Phelps Avenue, San Jose, Calif. 95117

[22] Filed: Dec. 20, 1971

[21] Appl. No.: 210,040

[52] U.S. Cl. ............................ 99/324, 233/11
[51] Int. Cl. .................................. A23l 3/16
[58] Field of Search .............. 99/252, 249, 251, 99/403, 211, 215, 216; 126/344, 348; 233/1 A, 11, 16, 19 R, 46, 47 R

[56] References Cited
UNITED STATES PATENTS

| | | | |
|---|---|---|---|
| 831,813 | 9/1906 | Weber | 233/11 UX |
| 1,181,695 | 5/1916 | Sweet | 233/16 |
| 1,340,177 | 5/1920 | Miller | 233/11 UX |
| 1,504,197 | 8/1924 | Davis | 233/11 X |
| 2,147,691 | 2/1939 | Cramton | 233/1 A |
| 2,405,103 | 7/1946 | Winn | 99/403 X |

Primary Examiner—Robert W. Jenkins
Assistant Examiner—Arthur O. Henderson
Attorney—Claude A. Fishburn et al.

[57] ABSTRACT

Apparatus for heat sensitive food processing includes a heater in the shape of a hollow inverted cone or bell adapted to spin on a vertical longitudinal axis within a pressure vessel having temperature controlled walls. Product to be processed is fed into the bottom of the bell and centrifugal force urges the product into a thin film as it travels up the sides. Product reaching the bell upper lip is thrown onto the container wall and the processed product is collected and withdrawn from the bottom of the vessel.

8 Claims, 1 Drawing Figure

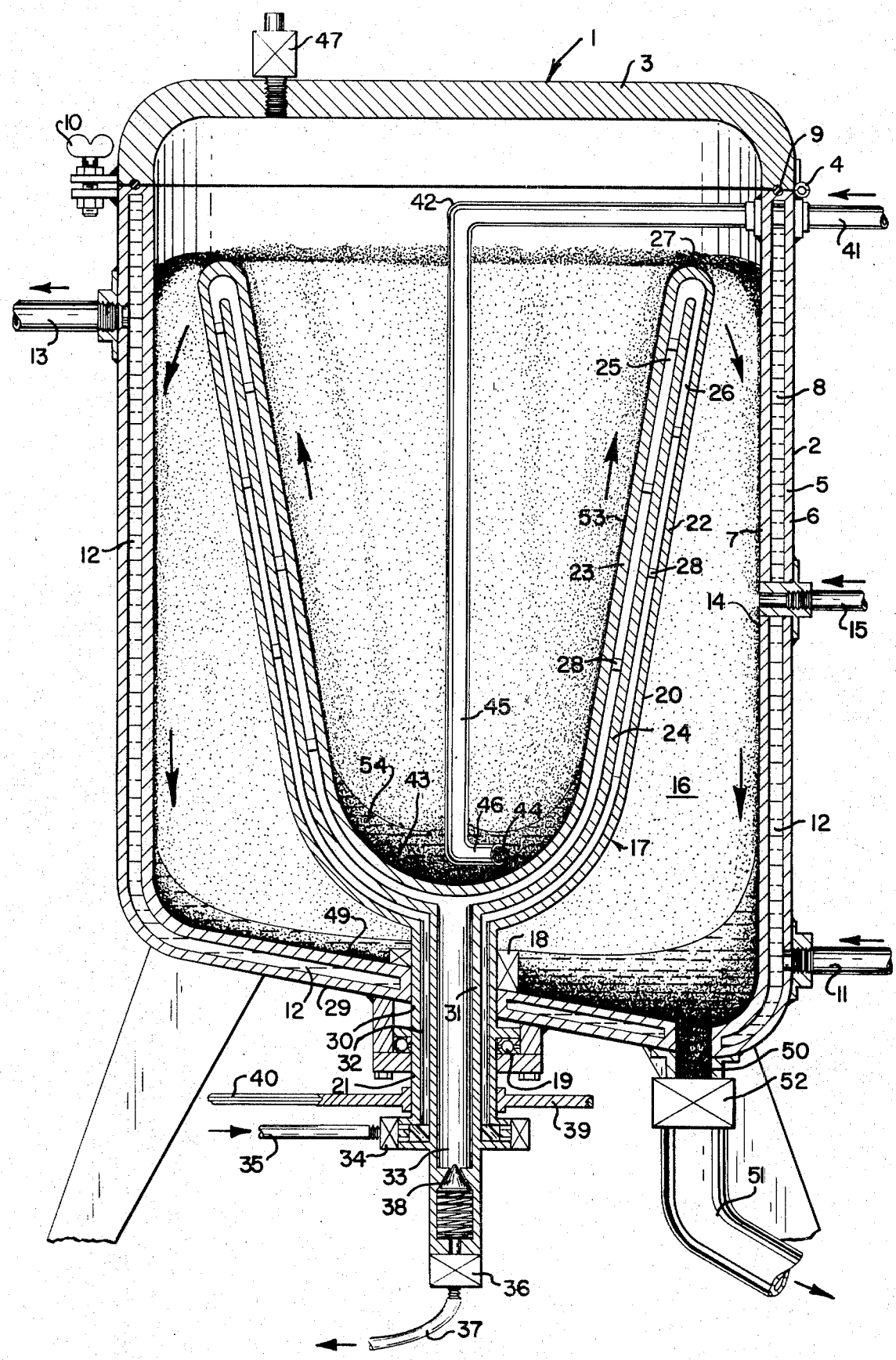

CENTRIFUGAL PROCESSING APPARATUS

This invention relates to food processes and, more particularly, the type known as "aseptic" during which a food product is first sterilized and then sealed in sterile containers. This is in contrast with conventional canning processes wherein non-sterile food is sealed in non-sterile containers and then the containers are subjected to sterilizing procedures.

It is broadly known to cook and/or sterilize and then cool heat sensitive food compositions and the like by sequentially urging same into thin films against heated and refrigerated bodies. Various devices have been suggested to accomplish this; however, heretofore they have been unwieldy and complex devices which are expensive to construct and difficult to maintain and clean.

In the practice of this invention, an inverted hollow cone or bell is heated and adapted to rotate on a vertical longitudinal axis within a closed container. Food product to be processed is introduced near the bottom, whereupon it spreads, under centrifugal force, into a thin film against the bell wall, causing it to be heated quickly and over a short period. The heated product is continuously discharged by centrifugal force over the upper lip of the bell and against the container wall, which may be refrigerated or otherwise temperature controlled. The product is collected at the bottom of the container and withdrawn for packaging.

The principal objects of the present invention are: to provide apparatus which permits short-term, closely controlled heating of heat-sensitive flowable products; to provide such apparatus which is relatively simple and inexpensive in construction and easy to maintain; to provide such apparatus which requires a minimum of space and auxiliary equipment; to provide such apparatus which is highly versatile and suitable for aseptic food processing; and to provide such apparatus which is efficient in operation and well suited for its intended purpose.

Other objects and advantages will become apparent from the following description taken in connection with the accompanying drawing wherein are set forth, by way of illustration and example, certain embodiments of this invention.

The FIGURE is a partially schematic cross-sectional view in side elevation showing a product sterilizer embodying this invention.

Referring to the drawing in more detail:

The reference numeral 1 generally indicates a short-term product sterilizer embodying this invention. The sterilizer 1 comprises a container 2, in this example including a lid 3 hinged at 4 to a cylindrical lower vessel portion 5. The lower vessel portion 5 comprises an outer jacket 6 spaced from an inner jacket 7 forming a cylindrical cavity or passageway 8 therebetween.

The container 2 is suitably constructed as a pressure vessel to withstand internal pressure necessary to produce desired heating temperature in water based products. For this purpose a suitable seal 9 is provided between the lid 3 and lower vessel portion 5. Conventional lid locking members 10 may be used to provide the forces necessary to achieve the sealing relation desired.

An inlet conduit 11 is secured to the outer jacket 6 and communicates into the passageway 8 for directing a temperature controlling liquid 12 into the passageway 8. An outlet conduit 13 also communicates with the passageway 8 to discharge spent liquid 12, thereby maintaining the interior surface 14 of the inner jacket 7 at the desired temperature through continuous circulation.

A third conduit 15 is secured to the container 2 and extends through the jackets 6 and 7 and passageway 8 into the container interior chamber 16, whereby the desired pressure may be maintained by suitable apparatus (not shown).

A centrifugal heater 17 is generally in the shape of an inverted cone or bell and is rotatably mounted on suitable container supported bearings 18 and 19 for rotation on a longitudinal vertical axis within the container 2. The bearing 18, in this example, is located within the chamber 16 and incorporates a suitable seal structure to avoid loss of chamber pressure and prevent contamination by each other of the bearing or container contents.

More specifically, the heater 17 comprises an upper or bell section 20 and a lower or stem section 21, the latter engaging the bearings 18 and 19. The bell section 20, in this example, comprises an outer wall 22, an inner wall 23, and a divider wall 24 spaced therebetween. Internal passageways 25 and 26 are thereby formed adjacent the inner wall 23 and outer wall 22, the passageways communicating near an upper lip or discharge portion 27 of the bell section 20. The divider wall 24 is suitable supported in position between the outer wall 22 and inner wall 23 by blocks or braces 28 which do not materially inhibit flow through the passageways 25 and 26.

The lower or stem section 21 supports the upper or bell section 20 and projects downwardly through and beyond the bottom 29 of the container 20. The stem section 21 is comprised of an outer shell 30 which is actually a downwardly directed continuation of the bell section outer wall 22, and an inner shell 31 which is a downwardly directed continuation of the bell section divider wall 24. The outer and inner shells 30 and 31 are spaced from each other forming a passageway 32 which communicates with the bell section internal passageway 26. The inner shell 31 forms a central passageway 33 which communicates with the bell section internal passageway 25.

A suitable rotating seal structure 34 provides communication between the stem passageway 32 and a conduit 35 through which a heating medium, such as steam under superatmospheric pressure, may be introduced. A second rotating seal structure 36 provides communication between an exit or drain conduit 37 and the stem internal passageway 33. A suitable pressure control valve 38 is schematically illustrated within the passageway 33 and functions to control the pressure therewithin while permitting spent heating fluid to exit through the conduit 37.

A suitable pulley 39 is secured to the stem section 21 and engages a conventional V-belt 40 which may be driven by a suitable prime mover (not shown) for selectively rotating the heater 17 within the stationery container 2.

A product feeder conduit 41 projects through the container jackets and extends horizontally over the lip portion 27 of the heater 17 to a point 42 which, in this example, is located coaxially with the bell section 20. The conduit 41, at point 42, depends into the bell section 20 and opens near the bottom 43 thereof in a discharge mouth 44. In this example, the discharge mouth 44 is laterally directed and spaced from the depending conduit portion 45, forming a small offset portion or paddle member 46.

A pressure safety valve 47 projects through the lid 3 to guard against accidental over-pressure within the container 2. The interior surface 49 at the container bottom 29 slopes downwardly toward a spout 50 connected to a finished product drain 51 through a suitable back-pressure valve 52 which will permit product discharge without an excessive pressure drop.

By way of operation, a suitable compressible fluid, such as sterile compressed air, is introduced into the container through the conduit 15 to achieve and maintain internal pressure at a desired level for rapid, high-temperature cooking. A temperature controlling liquid 12, for example ice water, is introduced into the passageway 8 by the conduit 11 and is circulated as rapidly as necessary therethrough and out the exit conduit 13 to maintain the interior surface 14 of the container at a desired cooling temperature.

A heating fluid, such as superatmospheric steam, is introduced through the conduit 35, from which it travels upwardly through the passageways 32 and 26, and downwardly through the passageway 25 where it heats the interior surface 53 of the bell section inner wall 23. The spent heating fluid exits from the heater downwardly through the central passageway 33, past the pressure-maintaining valve 38 and outwardly through the conduit 37.

A liquid, semi-liquid or small particle-liquid mixture food product 54 is introduced through the conduit 41 into the bottom 43 of the bell section 20. The bell section is rotated on its vertical axis by suitable variable speed drive means (not shown) engaged with the V-belt 40, imparting rotary motion to the food product 54 contained within the bell bottom 43. The centrifugal force thereby imparted to the food product 54 causes it to spread out into a relatively thin film and climb the sloping interior surface 53 where it is heated for a short period, depending upon a balance achieved between product viscosity, slope angle of the conical interior surface 53, diametrical and vertical size of the interior surface 53 and the rotational rate of the bell section 20. The flowable food product 54, upon reaching the upper lip or discharge portion 27, is directed radially outwardly against the container interior surface 14 where it may be rapidly cooled, if desired. The processed food product then travels downwardly along the interior surface 14 and collects on the container bottom 49 from which it is drained or discharged through the valve 52 and out the finished product drain 51.

The described system offers ease of control, permitting when desired, continuous accurate processing under aseptic conditions. By suitable modifying feeder conduit size, the type of drain valve 52, pressure, temperature and bell section rotational speed, a great variety of flowable products may be processed with high efficiency.

It will be recognized by one skilled in this art that several modifications of the described structure may be utilized without departing from the scope of this invention. For example, the bell section 20 may be heated electrically or by hot fluid tubes secured to the inner wall 23 rather than the multiple wall structure described. It will be further apparent to those skilled in the art that, if desired, second stage heating or warming may take place on the container inner surface 14 rather than cooling, or conversely, that both the bell section and the container inner surface may be refrigerated, whereby several units may be utilized in series as heaters and coolers. Still further, the container may be operated in a hypobaric rather than the hyperbaric vessel described whereupon the conduit 15 may be used to withdraw gas contained therein. Also, suitable pressure, temperature, and liquid level monitoring devices (not shown) may be incorporated into the structure for process control purposes.

Thus, it is to be understood that while certain forms of this invention have been illustrated and described, it is not to be limited thereto except insofar as such limitations are included in the following claims.

What I claim and desire to secure by Letters Patent is:

1. Processing apparatus comprising:
   a. an inverted bell member having a conical interior surface and a discharge portion,
   b. means operably engaging said bell member and rotatably driving same about an upwardly directed axis,
   c. means controlling the temperature of said bell member interior surface,
   d. means introducing a flowable product into said bell member, and
   e. means surrounding said bell member for receiving flowable product from said discharge portion.

2. The apparatus as set forth in claim 1 wherein said means surrounding said bell member comprises:
   a. a container for said bell member and having a product collecting bottom.

3. The apparatus as set forth in claim 2 wherein:
   a. said container is a pressure vessel and including,
   b. means for introducing pressurized fluid into said vessel.

4. The apparatus as set forth in claim 2 wherein:
   a. said container is a hypobaric vessel and including,
   b. means for withdrawing gaseous fluid from said vessel.

5. The apparatus as set forth in claim 2 wherein:
   a. said container includes temperature controlled walls, located in the path of the product.

6. The apparatus as set forth in claim 2 including:
   a. a drain member communicating into said product collecting bottom.

7. The apparatus as set forth in claim 1 wherein:
   a. said means controlling the temperature of said bell interior surface includes fluid conduits.

8. The apparatus as set forth in claim 1 wherein:
   a. said means for introducing a flowable product into said bell member includes a tube directed downwardly into said bell member.

* * * * *